United States Patent [19]

Copeland

[11] 4,383,280
[45] May 10, 1983

[54] RECORDER WITH TIMING CHANNEL

[76] Inventor: Peter Copeland, 11, June Close, Pagham, Bognor Regis, Sussex PO21 4UH, England

[21] Appl. No.: 63,728

[22] Filed: Aug. 6, 1979

[30] Foreign Application Priority Data

Aug. 16, 1978 [GB] United Kingdom ............... 33525/78

[51] Int. Cl.³ ........................... G11B 5/02; H04J 1/02; H04L 9/00
[52] U.S. Cl. ..................................... 360/18; 370/69.1; 375/2.1; 360/20
[58] Field of Search ....................... 360/10, 33, 20, 18, 360/72.2, 74.4, 19, 137; 358/27; 455/103, 116, 26, 108; 375/2.1; 370/69.1, 76; 179/1 GN, 1 GD

[56] References Cited

U.S. PATENT DOCUMENTS

| | | | |
|---|---|---|---|
| 3,017,616 | 1/1962 | Runyan | 360/20 |
| 3,591,731 | 7/1971 | Stancil | 360/20 |
| 3,681,524 | 8/1972 | Nicholls | 360/20 |
| 3,717,725 | 2/1973 | Numakura | 360/20 X |
| 3,761,611 | 9/1973 | Nakamura et al. | 360/10 |
| 3,830,968 | 8/1974 | Redlich et al. | 360/19 X |
| 3,875,583 | 4/1975 | Poetsch et al. | 358/27 |
| 3,913,135 | 10/1975 | Damalamian | 360/18 X |

OTHER PUBLICATIONS

"PCM Recorder, A New Type of Audio Magnetic Tape Recorder"; Sato; Journal of Audio Eng. Society, Sep. 1973, vol. 21, No. 7, pp. 542-548.
McGraw-Hill Encyclopedia of Science and Technology, vol. 1, ©1971, p. 388.

Primary Examiner—Aristotelis M. Psitos
Attorney, Agent, or Firm—Morgan, Finnegan, Pine, Foley & Lee

[57] ABSTRACT

A recorder apparatus comprises a modulator, arranged to be fed with a carrier signal of a frequency at the low end of the audio spectrum (e.g. 80 Hz), for pulse modulating said signal with serialized data corresponding to a time code. A voltage controlled amplifier is connected to the output from the modulator and controlled by an amplitude detector in a separate audio component channel. A mixer is arranged to mix the output from the voltage controlled amplifier and the second audio component channel for feeding to a record head. A play back apparatus which may be integral with the recorder apparatus comprises a low pass filter and a high pass filter arranged to be fed with signals from a read head. A decoder is connected to receive signals from the low pass filter via demodulator to provide time-code signals for a utilization device. The high pass filter is connected to a normal audio channel.

4 Claims, 3 Drawing Figures

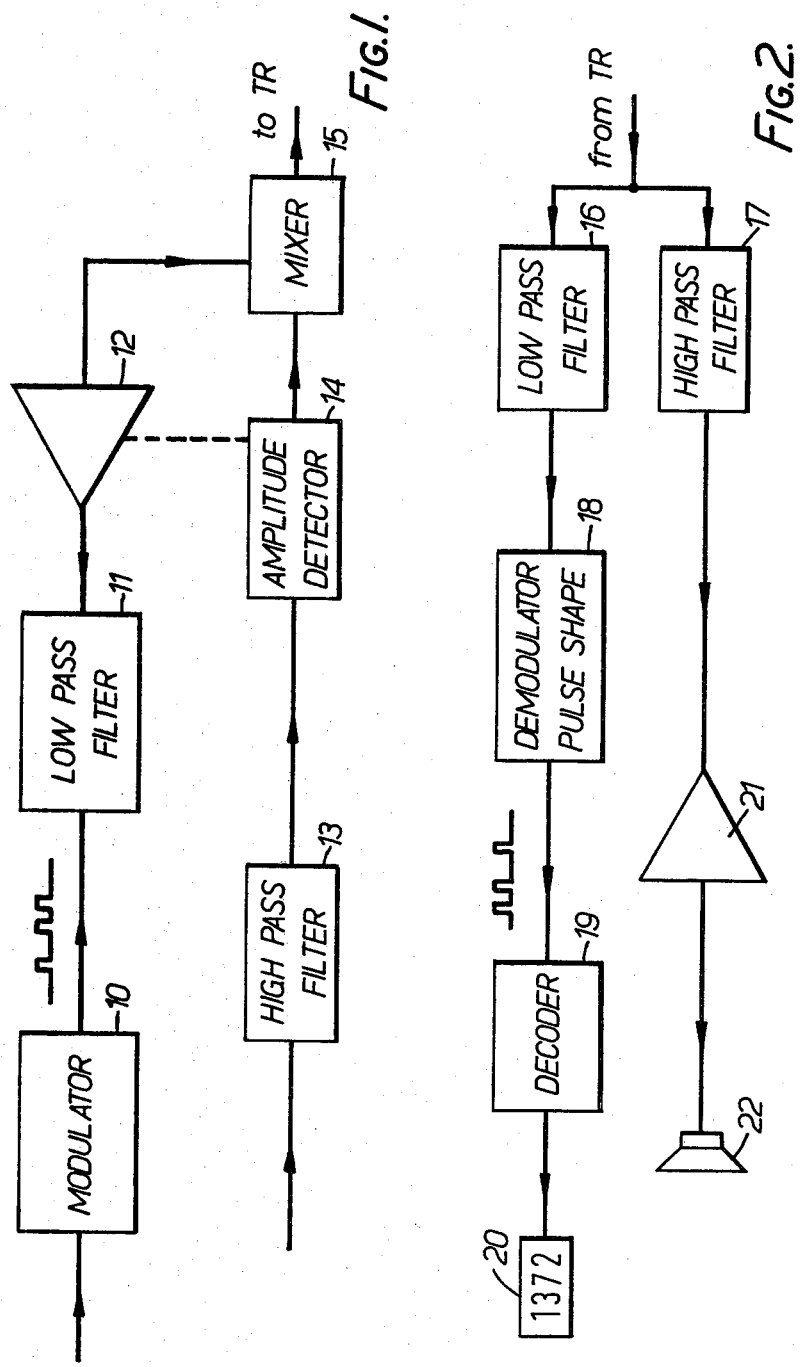

RECORDER WITH TIMING CHANNEL

The invention relates to recording/playing back an audio time-coded signal onto/from magnetic audio-tape, video-tape, data-tape or film for the purpose of providing an absolute address of the tape position.

According to one aspect of the invention a recorder apparatus comprises a modulator, arranged to be fed with a carrier signal of a frequency at the low end of the audio spectrum (e.g. 80 Hz), for pulse modulating said signal with serialised data corresponding to a time code, a voltage controlled amplifier connected to the output from the modulator and controlled by an amplitude detector in a second audio component channel and a mixer arranged to mix the output from the voltage controlled amplifier and the second audio component channel for feeding to a record head.

The output from the modulator may be connected via a low pass filter and the second audio component channel may include a high pass filter connected to the amplitude detector.

According to a further aspect of the invention a play back apparatus comprises a low pass filter and a high pass filter arranged to be fed with signals from a read head, a decoder connected to receive signals from the low pass filter via a demodulator to provide time-code signals for a utilisation device, the high pass filter being connected to a normal audio channel.

The play back and recorder apparatus may be incorporated into a single apparatus.

The foregoing and further features of the invention may be more readily understood from the following description of a preferred embodiment thereof, by way of example, with reference to the accompanying drawings, in which:

FIG. 1 is a block schematic representation of a recording circuit;

FIG. 2 is a block schematic representation of a play back circuit, and

Figure 3:
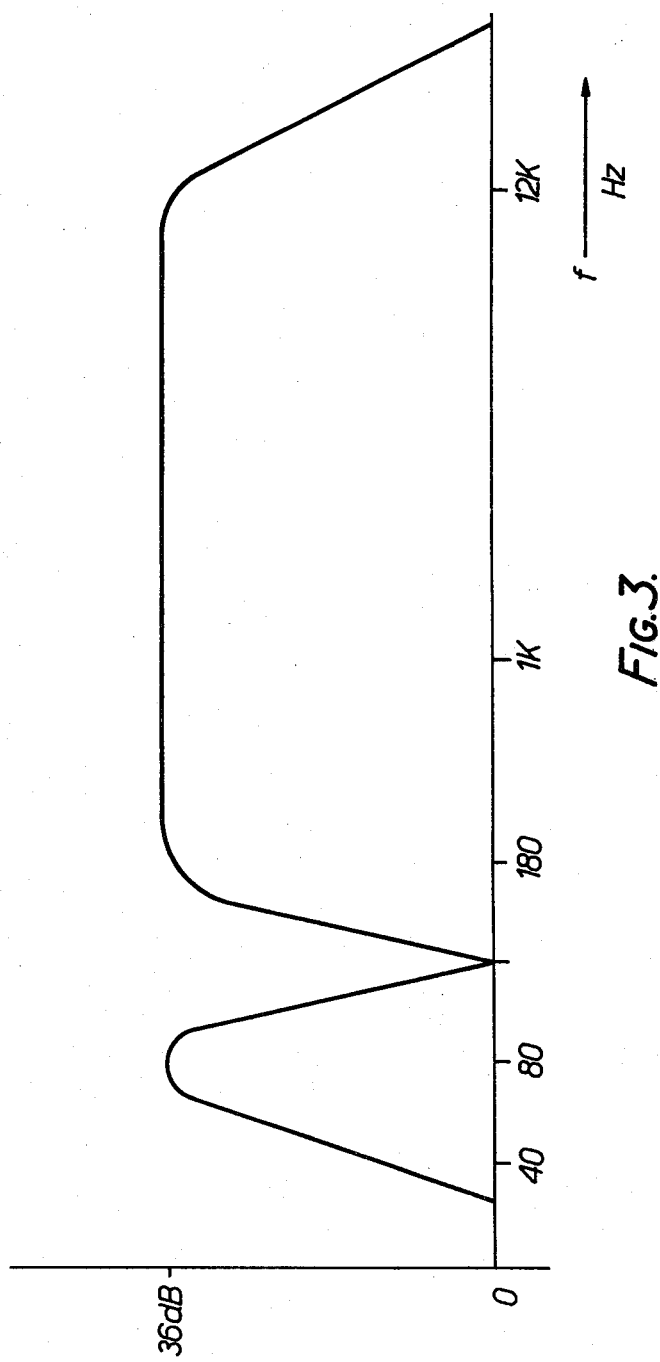
FIG. 3 is a graph showing typical frequency response of the circuits of FIGS. 1 and 2.

Referring firstly to FIG. 1 a recording circuit comprises a first channel for recording time-code data including a pulse modulator 10 connected via a low pass filter 11 to the input of a voltage controlled amplifier 12. A second channel for data, speech, music etc. comprises a high pass filter 13 connected to an amplitude detector 14 arranged to control amplifier 12. The outputs from amplifier 12 and detector 14 are connected via a mixer 15 to a record head (not shown).

Referring now to FIG. 2 a play back circuit is shown in which an input from a read head (not shown) is connected to a low pass filter 16 and a high pass filter 17. The output from filter 16 is connected via a demodulator or pulse shaper 18 and a decoder 19 to a utilisation device 20, shown as a time-code display device. Filter 17 is connected via an amplifier 21 to a loudspeaker 22.

The apparatus has the capability to record a time code along with other recorded information (data, speech, music etc) using the same recording track and channel. To help clarify the description of the system this additional recorded information is referred to as the second audio component.

A carrier signal of a frequency at the low end of the audio spectrum (e.g. 80 Hz) is passed to modulator 10 and pulse modulated with serialised data corresponding to a time-code which is up-dated each second.

The number of bits representing the code depends on the size of code and its format, i.e if each digit is separately encoded then its data length=7 bits per digit; if the total number is encoded then for a 60 min. tape (3,600 secs.) this four digit number could be encoded with a data length of 12 bits.

In the latter case this code could be derived from the 12 bit parallel output of a digital clock passed to a parallel to serial converter or UART, and pulse modulated at the chosen carrier frequency.

Alternatively, a microcomputer output could send the code-data in a serialised form to the pulse modulator.

Whichever method is used a pulse modulated carrier which contains a string of '1's and '0's together with start, stop and parity bits is generated by modulator 10.

An additional provision to overcome any speed variation during record and playback is a series of data markers which precede the start bit. During playback these are sampled to set the clock reference frequency to the playback speed of the subsequent data sampled.

Prior to recording the PCM signal is fed to the low pass filter 11 reducing significantly the high frequency components which would otherwise cause distortion during recording and additionally interfere with the second audio component.

The now triangular approximation of the PCM signal is fed to the voltage controlled amplifier 12 the purpose of which is to vary the amplitude of the signal in sympathy with the average level of the second audio component.

This action enables the ratio of time coded PCM signal to second audio signal to be predefined and maintained for the purpose of achieving satisfactory recording levels.

The additional audio component is taken to the high pass filter 13 to eliminate the risk of low frequency intermodulation and data errors.

From filter 13 the signal is passed to the amplitude detector 14 which provides the necessary control voltage to regulate the time-code signal's amplification in amplifier 12.

Both time-code signal and second audio component signal are now mixed by mixer 15 at a suitable ratio and presented at a level which meets the record amplifier input requirement, e.g 100 mV@1KΩ

During play back the output signal from the recording device is applied to the two filters, one high pass 17 the other low pass 16. These extract the second audio component and time-code signals respectively.

The low pass filter 16 effectively removes the second audio component leaving a triangular shaped waveform which approximates to the PCM signal.

The signal is now restored by the action of a squaring amplifier or Schmitt trigger by unit 18.

The decoding of the PCM signal is performed by either a microcomputer software routine sampling the input port to which the signal is applied or alternatively by an arrangement of hardware components.

In the latter case a clock referenced to the marker frequency discussed for recording could be gated with the data stream to derive the '1' '0' control bits.

This output could then be loaded into a serial in/parallel out shift/register and following parity gating its output could be displayed via a suitable interface by a 7 segment indicator(s) 20.

The high pass filter 17 encountered by the playback signal preserves those frequencies above the PCM carrier. The frequency response of the second audio component is thus preserved to a lower limit dependent on the slope of filter employed, e.g using a 36 dB/octave filter centered on a PCM carrier of 80 Hz, a typical second audio component lower frequency limit will be 180 Hz.

Both filters of each respective pass band employed during record and playback are arranged to have similar characteristics in order to preserve the frequency response of the second audio component, reduce the presence of time-code data noise on the second component channel and minimise the risk of intermodulation distortion.

A typical frequency response of the system is given in FIG. 3.

The apparatus can be used to provide the user with a VDU or digital display (LCD, LED etc) of current tape position and/or it can be used in conjunction with automatic programme retrieval systems.

I claim:

1. Apparatus for a recorded signal having a predetermined signal spectrum comprising:
   a first channel for carrying timing data, and a second channel for carrying said signal;
   a modulator located in said first channel for modulating a carrier, offset from said signal spectrum, with serialized data corresponding to a time code, the modulation of said carrier being a pulse code modulation;
   a filter located in said first channel and coupled to an output terminal of said modulator, said filter reducing the spectrum of said pulse code modulation to the reduced spectrum of a substantially triangular waveform, thereby inhibiting an overlapping of the modulation spectrum and said signal spectrum;
   means, coupled to an output terminal of said filter and responsive to the average level of said signal in said second channel, for controlling the amplitude of the output signal of said filter; and
   means for combining said filter output signal of said first channel with said signal of said second channel for feeding to a recording head, said amplitude controlling means maintaining a fixed ratio of recording level between signals of the two channels.

2. Apparatus as claimed in claim 1 wherein said amplitude controlling means includes a voltage controlled amplifier in said first channel, and a detector in said second channel for detecting the amplitude of said second-channel signal.

3. Recorder-playback apparatus for a recorded signal having a predetermined signal spectrum comprising:
   a first channel for carrying timing data, and a second channel for carrying said signal;
   a modulator located in said first channel for modulating a carrier, offset from said signal spectrum, with serialized data corresponding to a time code, the modulation of said carrier being a pulse code modulation;
   a filter located in said first channel and coupled to an output terminal of said modulator, said filter reducing the spectrum of said pulse code modulation to the reduced spectrum of a substantially triangular waveform, thereby inhibiting an overlapping of the modulation spectrum and said signal spectrum;
   means, coupled to an output terminal of said filter and responsive to the average level of said signal in said second channel, for controlling the amplitude of the output signal of said filter;
   means for combining said filter output signal of said first channel with said signal of said second channel for feeding to a recording head, said amplitude controlling means maintaining a fixed ratio of recording level between signals of the two channels; and wherein playback means of said apparatus comprises
   means, to be coupled to a read head, for spectrally separating signals of said first and said second channels; and
   means responsive to said substantially triangular waveform of said first channel for regenerating the waveform of said pulse code modulation, an output signal of said regeneration means to be coupled to a time-code utilization device.

4. Apparatus comprising:
   a timing channel for receiving a timing signal to be recorded;
   a data channel for receiving a signal to be recorded, a central spectral line of the timing signal of said timing channel lying outside the spectrum of the data signal of said data channel;
   means responsive to the average value of said data signal in said data channel for controlling the amplitude of said timing signal of said timing channel for a desired ratio of recording level between said data and timing signals;
   head means for recording and reading signals of a storage medium;
   means in said timing channel for modifying a waveform of the timing signal, the modified signal having a substantially triangular waveform of reduced bandwidth;
   means coupled to said head means during recording for combining said modified signal with said data signal;
   means coupled to said head means during playback for separating said modified signal from said data signal; and
   means coupled to said separating means for regenerating said timing signal from said modified signal to permit use of said timing signal during playback.

* * * * *